United States Patent [19]
Fukuoka et al.

[11] Patent Number: 5,754,740
[45] Date of Patent: May 19, 1998

[54] PRODUCTION SYSTEM

[75] Inventors: Toshiyuki Fukuoka; Satoshi Hikida, both of Kawasaki, Japan

[73] Assignee: Fujitsu Limited, Kawasaki, Japan

[21] Appl. No.: 518,393

[22] Filed: Aug. 15, 1995

[30] Foreign Application Priority Data

Nov. 11, 1994 [JP] Japan ................................ 6-277944

[51] Int. Cl.$^6$ ................................................ G06F 15/18
[52] U.S. Cl. ................................................ 395/68
[58] Field of Search .................................. 395/68

[56] References Cited

U.S. PATENT DOCUMENTS 5,418,887  5/1995  Connah et al. ............................ 395/68

OTHER PUBLICATIONS

"Suspending and Resuming the Execution of an Expert System"; IBM Technical Disclosure Bulletin, vol. 28, No. 7, pp. 3187-3188 (Dec. 1985).

"Rete: A Fast Algorithm for the Many Pattern/Many Object Pattern Match Problem"; Artificial Intelligence, vol. 20, pp. 17-37 (1983).

"Sumulated World of Hypotehtical Life Forms-Virtual Creatures"; Human-Computer Interaction: Software . . . Human-Computer Interaction, vol. 2, 8-13, pp. 663-668 (Aug. 1993).

B.A. Haugh, "Simple Casual Minimization, for Temporal Persistence and Projection," Proc. AAAI 1987, pp. 218-223, Dec. 1987.

W.A. Perkins and A. Austin, "Adding Temporal Reasoning to Expert-System-Building Environments," IEEE Expert, pp. 23-30, Feb. 1990.

A.M. Kabakcloglu, "Temporal Production Systems," Proc. SOUTHEASTCON '92, vol. 2, pp. 697-698, Apr. 1992.

G.S. Elofson and B.R. Konsynski, "Learning on a Blackboard: Solving Problems that Change Over Time," 1993 Ann. Hawaii Int'l. Conf. on System Sciences, vol. III, pp. 563-574, Jan. 1993.

F. Ramparany, et al., "Integrating Casual and Coarse Grain Temporal Reasoning in a Model Based Control System," 1994 Conf. on Artificial Intelligence Applications, pp. 389-395, Mar. 1994.

B.E. Prasad, et al., "An Expert System Shell for Aerospace Applications," IEEE Expert, pp. 56-64, Aug. 1994.

*Primary Examiner*—Robert W. Downs
*Attorney, Agent, or Firm*—Staas & Halsey

[57] ABSTRACT

When the system simulates changes of a virtual world and behavior of virtual creatures inhabiting it, the unit time of real time corresponding to the unit time necessary for one processing by the system is divided as time grading. Specifically, when the system is booted up, corresponding to the duration from the time the system power source is cut off previously, simulation is performed by setting the time grading in one second, one minute, one hour, one day, one week, one month, or one year, for one processing by the system. By upon starting-up of the system, introducing such concept of time grading for the time series, simulation is performed at the time grading corresponding to the duration of the period in which the system has been stopped so far, so that prompt simulation is realized.

4 Claims, 8 Drawing Sheets

| TIME GRADING | COVERING PERIOD OF SIMULATION | COVERING TIME OF ONE SIMULATION PROCESSING |
|---|---|---|
| 4 (LARGE) | SEVERAL MONTHS TO ONE YEAR | TEN DAYS TO ONE MONTH |
| 3 (MEDIUM) | TEN DAYS TO ONE MONTH | ONE DAY TO ONE WEEK |
| 2 (SMALL) | ONE DAY TO ONE WEEK | TEN MINUTES TO SEVERAL HOURS |
| 1 (VERY SMALL) | TEN MINUTES TO SEVERAL HOURS | SEVERAL TENS OF SECONDS |

DECLARATION OF WORKING MEMORY

```
class       class name(grading){
class type         variable name;
              .
              .
              .
}
```

FIG. 6

DECLARATION OF RULE

```
rule rule name{
    conditional expression
    =>
    {
      excute expression #1
    }
    {
      excute expression #2
    }
    .
    .
    .
}
```

FIG. 7

| TIME GRADING | VARIABLE | PRODUCTION RULE |
|---|---|---|
| 4 | V1: COMFORT/ DISCOMFORT | |
| 3 | V2: FATIGUE<br>V5: MOVE/ NOT MOVE | if V2=FATIGUED<br>then #1: NOT MOVE<br>(V5 TO 0)<br>then #2: REST<br>(V3 DECREASED) |
| 2 | V3: MOMENTUM | |
| 1 | V4: LOCATION | |

FIG. 8

PRODUCTION SYSTEM

BACKGROUND OF THE INVENTION

1. Field of the Invention

The present invention relates to a production system, and more particularly to a production system capable of simulating the status in the system corresponding to the lapse of time while the system is stopped upon restarting.

2. Description of the Related Art

Figure 1:
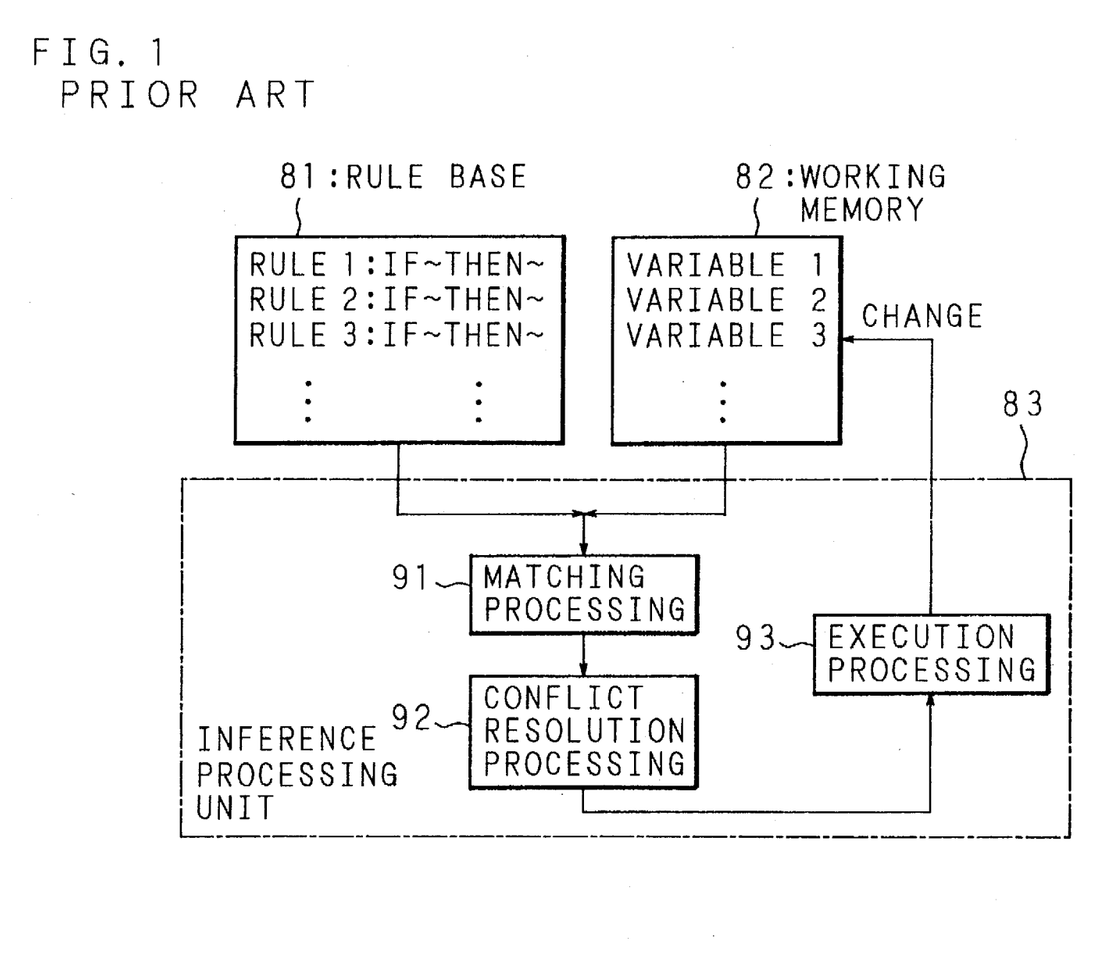
FIG. 1 is a schematic diagram showing a general configuration example of a conventional production system.

FIG. 1 is a schematic diagram showing a general configuration example of a conventional production system. In FIG. 1, reference numeral 81 denotes a rule base composed of a set of plural production rules each of which has a form of "IF-THEN (condition part–execution part)". Reference numeral 82 shows a working memory, in which the situation or event to be processed by the system is stored as a database in the form of variables or data. Reference numeral 83 represents an inference processing unit, which updates the variables in the working memory 82 by applying the rules in the rule base 81.

The inference processing unit 83 executes a matching processing 91 by matching the condition part of each production rule with the variable in the working memory 82, and picking up the production rule satisfying the condition part from the rule base 81. At this time, when plural production rules are picked up, they are called conflict rules, and conflict resolution processing 92 is executed in order to select only one production rule by the inference processing unit 83 in accordance with the predetermined basis. In this way, the inference processing unit 83 executes an execution processing 93 of the selected production rule. As the inference processing unit 83 repeats such processing, data processing is executed.

In such a conventional production system, however, when there is any change in the variable in the working memory 82, the matching processing 91 is done on all production rules in the rule base 81 in order to obtain a result corresponding to a new status after the change. Therefore, as the number of production rules or variables increases, the time required for the matching processing is extended, and the processing cycle of the matching processing, conflict resolution processing and execution processing becomes longer, which causes various problems.

Recently, incidentally, a system is realized, in which an image projected on a television screen can be changed by a human influencing externally through various interfaces. In such system, usually, the system is booted up when the power is turned on and the basic program is loaded, thereby allowing a human to influence externally. When the power is cut off, all processings are over on the spot, and when the power is turned on next time, the system is newly booted up completely regardless of the previous operating status, and the basic program is loaded, thereby setting in a state ready for a human to influence externally or the same state when the power is cut off at the previous time.

Unlike such a conventional system in which the program is executed by a human influencing externally, a system which runs autonomously without an influence by a human or which is triggered by an influence by a human is developed. More specifically, assuming a certain world within a system, it is the system in which virtual creatures inhabit such a world. Such system has been developed and already put to practical use for the purpose of presenting virtual pets for people who cannot keep creatures as pets due to housing problems, or those who cannot take care of pets sufficiently due to limitations in time.

In such a system handling virtual creatures, while it is running, it is possible to simulate the behavior of the virtual creatures in real time in synchronism with the actual world outside the system, and responds to an influence by a human outside the system. This state is called a real time simulation.

On the other hand, from the time the system power source is cut off until it is turned on again, that is, during the system shutdown period, when there is no change at all in the virtual creatures and the world in which they inhabit, it is very unnatural as compared with the cases in which actual creatures are kept. To eliminate such unnaturalness, it is necessary to change the virtual creatures and the world in which they inhabit corresponding to the duration of system shutdown period. Changes of the world in which the virtual creatures inhabit are mainly time changes by the move of the sun in a day, and seasonal changes in a year. Changes of the virtual creatures themselves are mainly diurnal deeds corresponding to the changes of the world in a day, that is, various deeds characteristic of the creatures from waking up in the morning till falling in sleep at night in case of diurnal creatures, and changes in a year are the deeds repeated in annual unit such as migration and hibernation depending on the seasonal changes of the world, and growth depending on the growth rate of specific creatures.

Therefore, when the system shutdown period is only several minutes, it may not be necessary to simulate for such period, but when the period is several hours, it is necessary to simulate whether the creature is fed or not and are feeling more hungry. When the system shutdown period is several days, it is necessary to simulate whether the creature has made any contact with other creature living in the same world in this period or not, or the sentiment toward the host of the creature has been changed or not. Moreover, when period is several months, it is necessary to simulate whether the hair is changed corresponding to the seasonal changes or not, or other change has occurred or not.

Therefore, in such a system in which virtual creatures inhabit a virtual world, when the system is booted up by turning on the power, it is required to simulate various changes of the situation mentioned above in response to the actual time since the system power was cut off previously. Generally, the system shutdown period is unfixed, and it cannot be predicted by the system. For the system, accordingly, it is necessary to assume the simulation period from a very short period to a considerably long period. What matters at this time is how much time is required for the system for simulating, and whether it is necessary or not to maintain matching of the initial value of the internal situation of the system being set upon restarting of the system.

When such a simulation as mentioned above is done by making use of the conventional production system, the production rule for real time simulation is directly employed, and although the required simulation time is not so long when the period to be simulated is relatively short, a long time is needed for simulation when the period to be simulated is longer, and it is not realistic from the practical aspect of the system. For example, when simulating the behavior of virtual creatures for a month, when daily deeds are simulated sequentially, the simulation is real, but a tremendous quantity of calculation is needed, or a very long time is taken for calculation, which is far from practicable.

Or, it may be also considered to constitute by being composed of a module for ordinary real time simulation in the production system, and an extra module for simulation in the system shutdown period, and the extra module is actuated when the system is restarted, and the initial value of the working memory in the system is set. In this case, however, although the calculation time is relatively short, since a module different from the ordinary module for real time simulation is used, state different from the simulation by the module for real time simulation may be simulated. It hence gives rise to necessity of preparing complicated production rules newly so as to match the simulation results by the two modules.

In this example, supposing that the production rule is described so that the virtual creature changes the variable of the degree of hunger at a rate of 10% per hour, when the system is stopped just before meal time and restarted nine hours later, the variable of the degree of hunger of the virtual creature is almost close to the limit. In this system shutdown period of nine hours, however, the creature should have eaten, and in order to match the status, an algorithm for adjusting the variable of the degree of hunger by corresponding to the system stopping time and restarting time is needed additionally. Such algorithm is necessary also for other variables, and it is far from realistic considering from the required memory capacity and calculation time.

SUMMARY OF THE INVENTION

The invention has been devised in view of such circumstance, and it is an object thereof to provide a production system capable of simulating promptly without requiring an extra module, by introducing the concept of grading for the series of time (hereinafter to be called time grading), and simulating at time grading corresponding to the duration of the period to be simulated.

It is another object to provide a production system capable of simulating promptly without requiring an extra module, by simulating at the time grading corresponding to the duration of the shutdown period at the time point of restarting.

It is a further object of the invention to provide a production system free from the inconvenient points mentioned above by simulating at a lower time grading than a day, when simulating at a time grading of one day in case of simulation of the system shutdown period, in the period from the system stopping time till the boundary of a day, and in the period from the boundary of a day when the system is restarted till the restarting time.

The above and further objects and features of the invention will more fully be apparent from the following detailed description with accompanying drawings.

DESCRIPTION OF THE PREFERRED EMBODIMENTS

At first, a basic principle of the production system of the invention is described below.

The concept of time grading introduced into the invention is the division of unit time of real time corresponding to a unit time necessary for one processing of the system itself when the system simulates changes of the virtual world and the behavior of the virtual creatures inhabiting it. More specifically, when the system is booted up, the time grading for one processing of the system is set in one second, one minute, one hour, one day, one week, one month, or one year, corresponding to the duration from the time the system power source is cut off previously, and simulation is performed. Therefore, the real time simulation is nothing but simulation of real time corresponding to the time necessary for the system by one processing. In the invention, the simulation of the virtual world and behavior of virtual creature during system shutdown period is called a dynamic time grading simulation.

Figure 2:
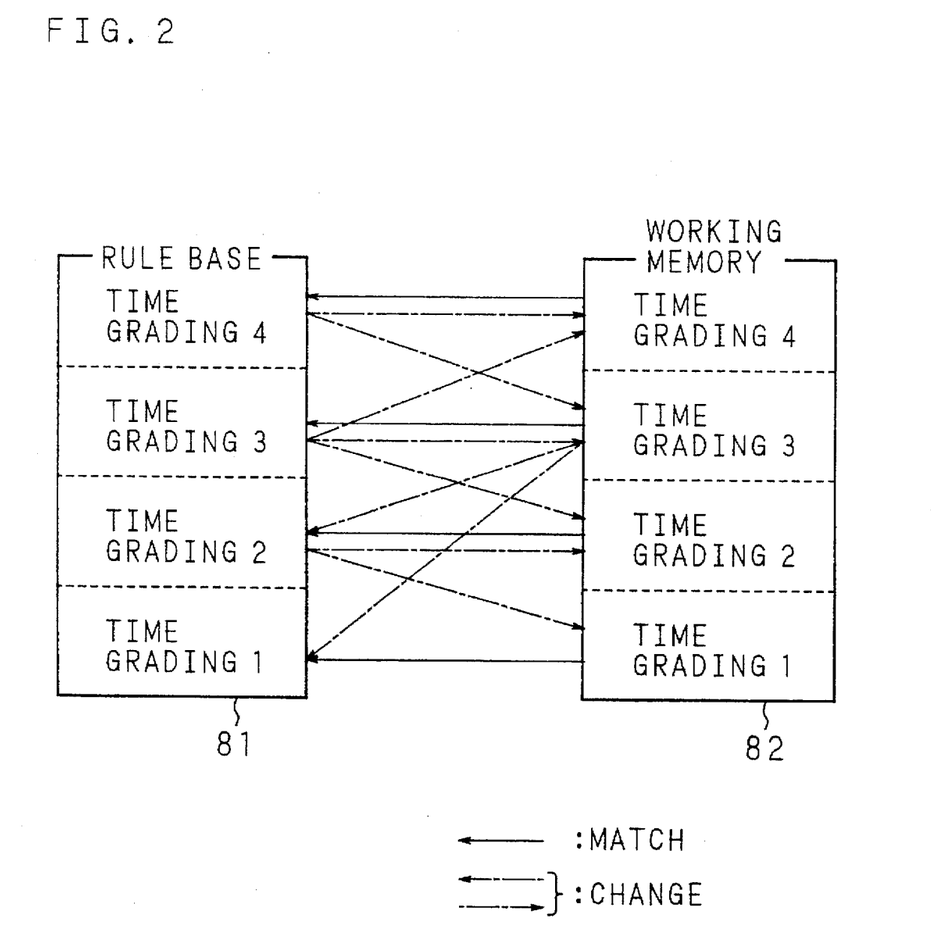
FIG. 2 is a schematic diagram showing that contents of a working memory and a rule base of a production system of the invention has a time-related hierarchical structure.

FIG. 2 is a schematic diagram showing that the contents of a working memory 82 and a rule base 81 of the production system of the invention has a time-related hierarchical structure, that is, is classified depending on the time grading. Referring first to FIG. 2, a basic principle of the production system of the invention is described below.

In the invention, the variables in the working memory 82 and the production rules in the rule base 81 are both classified corresponding to the time grading. Specifically, in the embodiment shown in FIG. 2, corresponding to four levels of time grading, both rule base 81 and working memory 82 are classified in four classes, and as shown in the list in FIG. 3, for example, time grading 1 is to simulate a period of about 10 minutes to several hours, and the system performs the dynamic time grading simulation for the time of about several tens of seconds by one processing. Time grading 2 is to simulate a period of about one day to one week, and the system performs the dynamic time grading simulation for the time of about 10 minutes to several hours by one processing. Time grading 3 is to simulate a period of about ten days to one month, and the system performs the dynamic time grading simulation for the time of about one day to one week by one processing. Time grading 4 is to simulate a period of about several months to one year, and the system performs the dynamic time grading simulation for the time of about ten days to one month by one processing.

Figure 3:
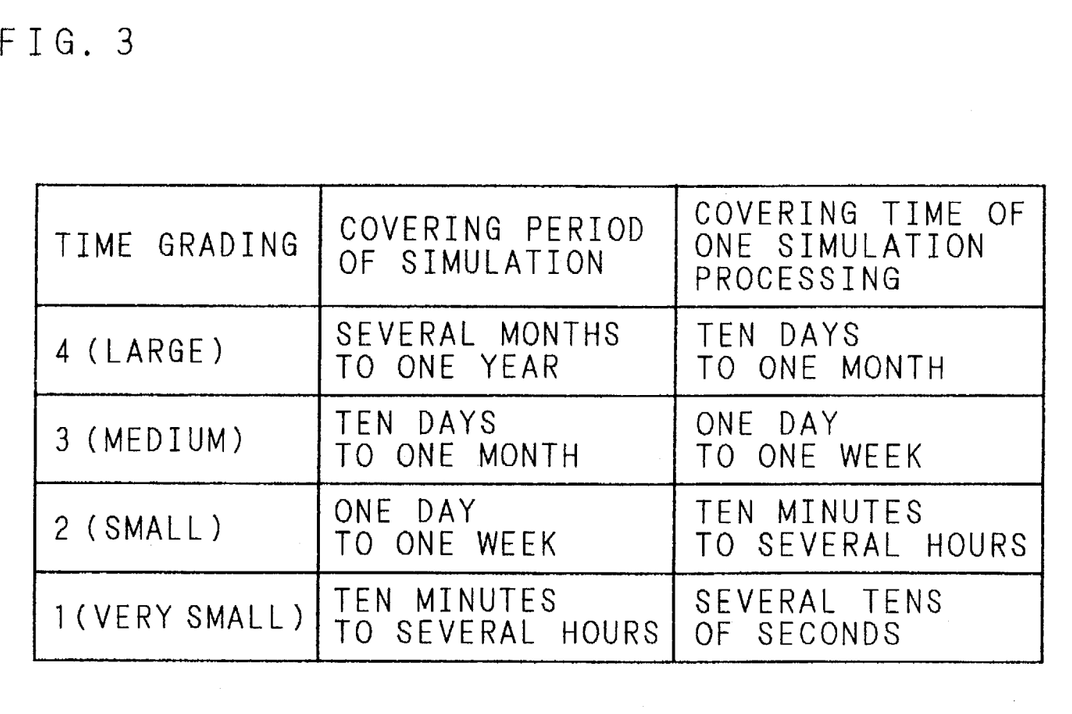
FIG. 3 is a list showing an example of a time-related hierarchical structure of a working memory and a rule base of the production system of the invention.

In this case, generally, the variable handled at the time grading of a shorter unit time is low in the degree of abstract in the time series, or, in other words, more specific, while the variable handled at the time grading of a longer unit time is high in the degree of abstract in the time series. For example, the location of virtual creature is regarded as variable of time grading 1, the momentum of virtual creature as variable of time grading 2, the fatigue or move/not move of virtual creature as variable of time grading 3, and the comfort/ discomfort of virtual creature as variable of time grading 4.

Matching processing is effected on the time grading subjected to be simulated and the higher classes of the rule base 81 and the working memory 82, and the lower classes of the rule base 81 and the working memory 82 than the time grading to be simulated are not processed. In change processing, however, in response to the necessity of execution result of production rule, processing may be done on both upper classes and lower classes.

By actually simulating after first determining the time grading subjected to be processed, the time required for simulation is substantially curtailed in the production system of the invention.

Figure 4:
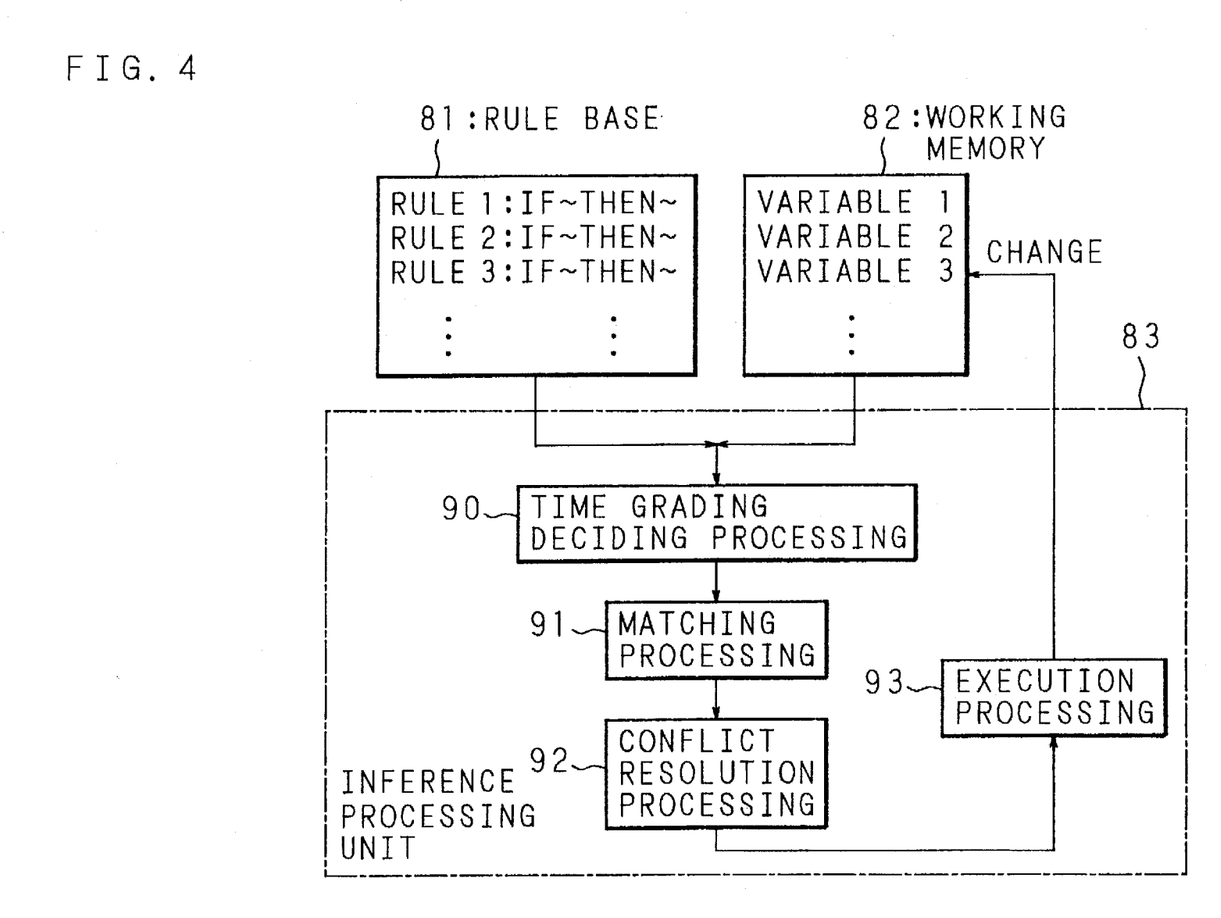
FIG. 4 is a schematic diagram for explaining the structure and operation of the production system of the invention.

A specific embodiment of the invention is described below by referring to the accompanying drawing. FIG. 4 is a schematic diagram for explaining a specific configuration example of the production system of the invention and its operation.

In FIG. 4, reference numeral 81 denotes a rule base, which is composed of a set of plural production rules in the form of "IF-THEN (condition part-execution part)". Reference numeral 82 shows a working memory, in which the situation or events to be processed by the system is stored as database in the form of variables or data. Reference numeral 83 represents an inference processing unit, which updates the variables in the working memory 82 by applying the rule in the rule base 81.

Figure 5:
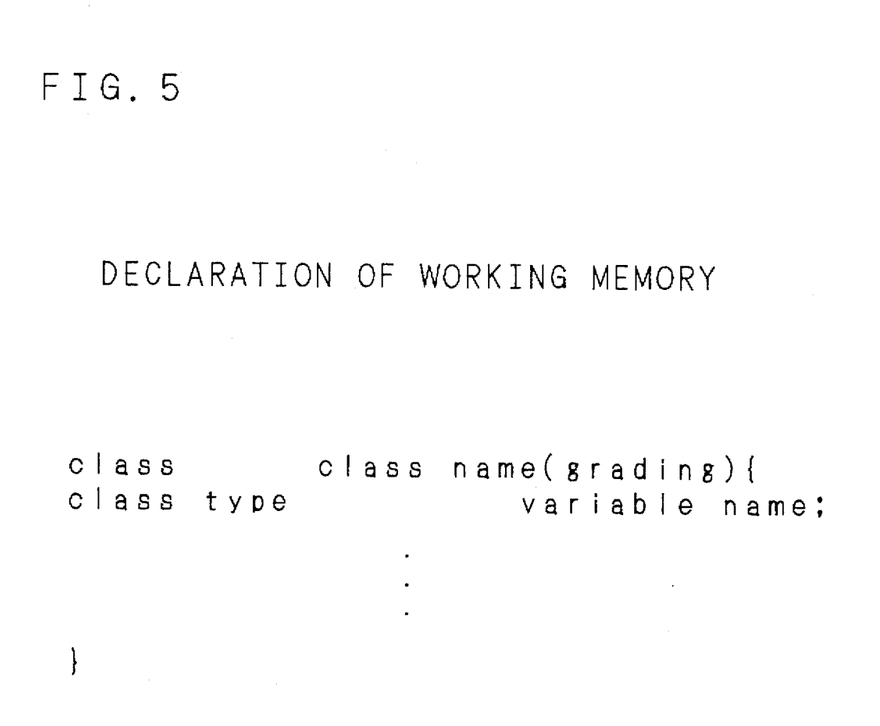
FIG. 5 is a schematic diagram showing a declaration of variables in the working memory of the production system of the invention.

In the production system of the invention, however, as shown in the schematic diagram in FIG. 2, the production rules in the rule base 81 and the variables in the working memory 82 are preliminarily classified corresponding to specific predetermined time grading. More specifically, variables in the working memory 82 are declared in the form of containing the time grading preliminary (1 to 4 in this embodiment) as shown in the schematic diagram in FIG. 5.

Figure 6:
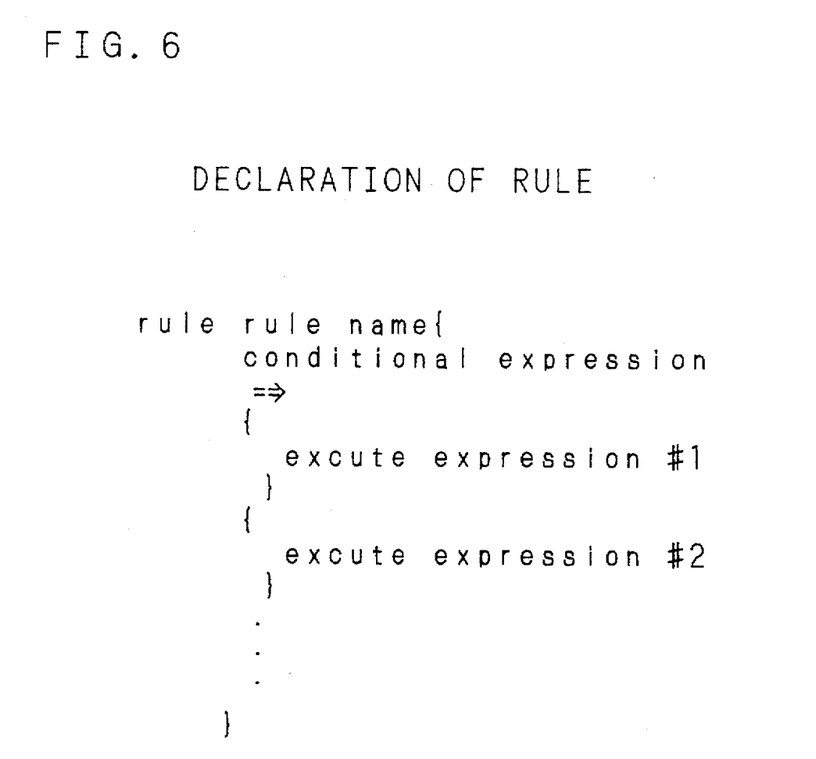
FIG. 6 is a schematic diagram showing a declaration of production rules in the working memory of the production system of the invention.

In the ordinary production system, one execute expression corresponds to one conditional expression, but in the production system of the invention, each production rule in the rule base 81 is declared so that one conditional expression may correspond to either one execute expression (#1) or plural execute expressions (#1, #2, . . . ) as required. Herein, the execute expression #1 is the execute expression for same time grading, and execute expression #2 and the following are execute expressions for lower time gradings.

The inference processing unit 83 matches the condition part of each production rule with the variable in the working memory 82, and executes a matching processing 91 to pick up the production rule in which the condition part is established from the rule base 81. At this time, when the plural production rules are picked up, they are called conflict rules, and the inference processing unit 83 executes a conflict resolution processing 92 to select only one production rule according to the predetermined basis. In this way, the inference processing unit 83 executes an execution processing 93 of the selected production rule. As the inference processing unit 83 repeats such processing, data processing is executed.

A basic flow of processing by the production system of the invention shown in FIG. 4 is as follows.

In the production system of the invention, when the system is booted up to perform the dynamic time grading simulation, at first, a processing 90 for deciding the time grading to be processed is performed. That is, when the system is booted up, the lapse of time from the time point when the system power source was cut off previously is obtained in real time, and the time grading to be processed is decided in response to the duration of the time.

For example, in the embodiment, the time grading is set as shown in the list in FIG. 3. Therefore, when the system shutdown period is two weeks, for example, the time grading is determined to be 3.

In the same way as in the conventional system, then, the matching processing 91 is executed with respect to the rule base 81, and at this time the variables in the working memory 82 having the time grading higher than the decided time grading is processed. As a result of execution of the matching processing 91, when plural production rules are picked up from the rule base 81, the conflict resolution processing 92 is executed. The inference processing unit 83 executes the execution processing 93 with respect to the selected production rule. In this case, when the variable to be changed is a variable of time grading 3, the execute expression #1 of the production rule is executed, and when it is a variable of time grading 2, execute expression #2 is executed, and the variable in the working memory 82 corresponding to the result is changed.

As the inference processing unit 83 repeats such processing, and data processing is executed.

Figure 7:
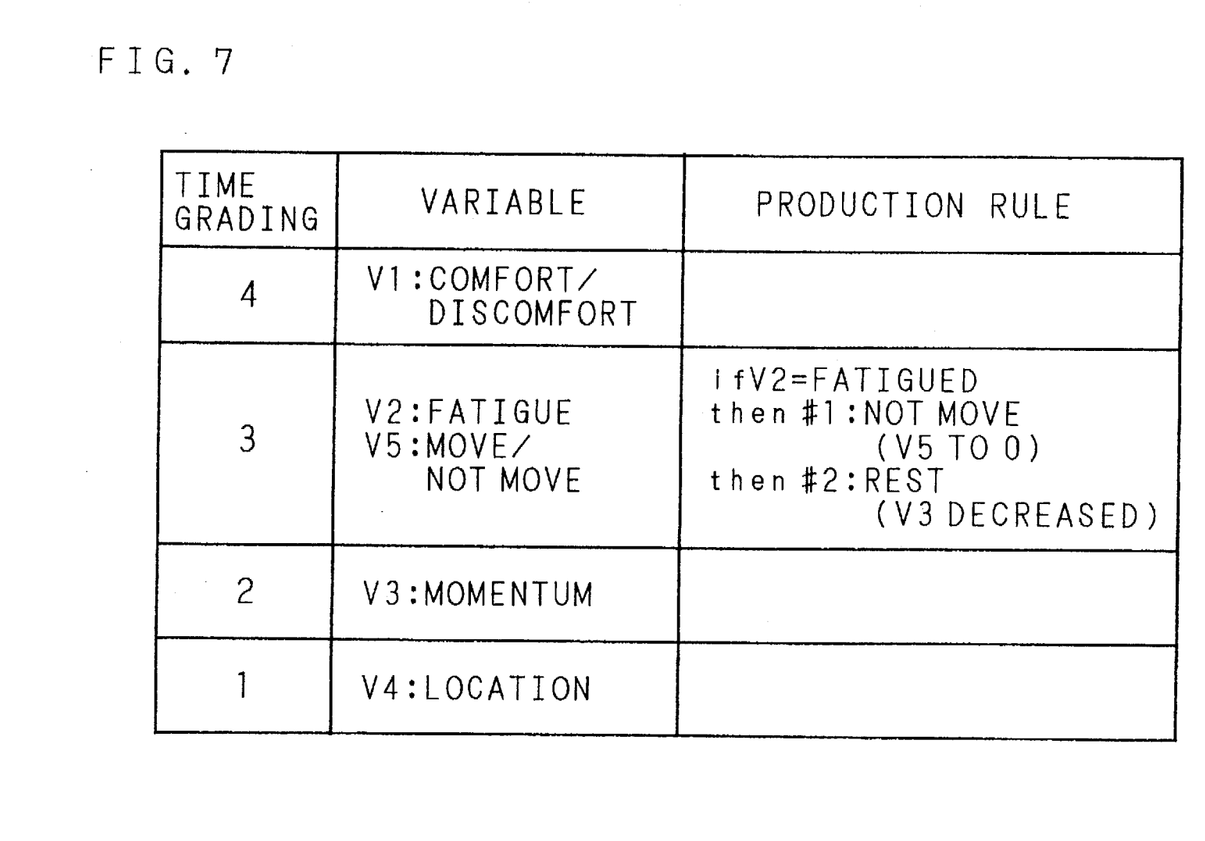
FIG. 7 is a schematic diagram showing variables corresponding to time gradings and a production rule corresponding to time grading 3 in an embodiment of the production system of the invention.

As a practical example, for example, the dynamic time grading simulation of behavior of virtual creatures inhabiting a virtual world is explained. FIG. 7 is a schematic diagram showing variables V1 to V5 corresponding to each time grading and the production rules corresponding to the time grading 3.

In this example, in the working memory 82, it is supposed that the location of virtual creature is preliminarily stored as variable 4 of time grading 1, the momentum of virtual creature as variable V3 of time grading 2, the fatigue or move/not move of virtual creature as variable V2 of time grading 3, and comfort/discomfort of virtual creature as variable V1 of time grading 4. In the rule base 81, on the other hand, it is supposed that "if virtual creature is fatigued, then #1 not move, or #2 rest" is stored as production rule.

In this way, a variable of lower degree of abstract in time series is assigned for a time grading of shorter corresponding unit time, and a variable of higher degree of abstract in time series is assigned for a time grading of longer corresponding unit time. In other words, more variables correspond to the time grading of shorter corresponding unit time, and fewer variables correspond to the time grading of longer corresponding unit time.

When it is supposed that the dynamic time grading simulation is done at time grading 3, and when variable 2 is "fatigued," not to move (V5=0) is obtained as the result of time grading 3. Therefore, the variable V5 of the working memory 82 is changed to "0". It is possible, however, to decrease the momentum of virtual creature by decreasing the variable V3 of time grading 2, that is, one class lower. In this case, the value of the variable V3 of the working memory 82 is made to be smaller.

Thus, in the production system of the invention, since the variable V3 showing the fatigued state of virtual creature corresponds to time grading 3, the matching processing is done only at the level of time grading 3 of rule base 81 and working memory 82, and subsequent changing processings of the variables are executed. Therefore, matching processings are not done on the classes of time grading 2 and 1 where more variables are assigned as composed with time grading 3, so that the time for processing is shortened, and moreover simulation is done by the variable and production rule corresponding to a longer unit time for one processing time of the system, corresponding to the time grading in which the simulation itself is set, so that the processing time is substantially shortened.

This embodiment relates to a so-called dynamic time grading simulation for simulating the state of the virtual world and the behavior of virtual creature during the system shutdown period upon restarting of the system, but the invention is evidently applicable to a general simulation, too.

Incidentally, it is also possible to change the time grading in the midst of one dynamic time grading simulation. This is because of the following necessity. For example, when dynamic time grading simulation at a relatively large time grading on the basis of the system shutdown period is executed, there is a possibility that the matching may not be ensured at a class lower than the class of the simulated time grading in the working memory 82. For example, as shown in the schematic diagram in FIG. 8, it is supposed that the system is stopped when real time simulation is conducted up to 21:00 (9 o'clock in the evening) on the first day of X-th month, and restarted three days later at 4:00 (4 o'clock in the morning) on the fourth day of X-th month. In such a case, the dynamic time grading simulation is conducted when the system is restarted at 4:00 (4 o'clock in the morning) on the fourth day of X-th month.

Figure 8:
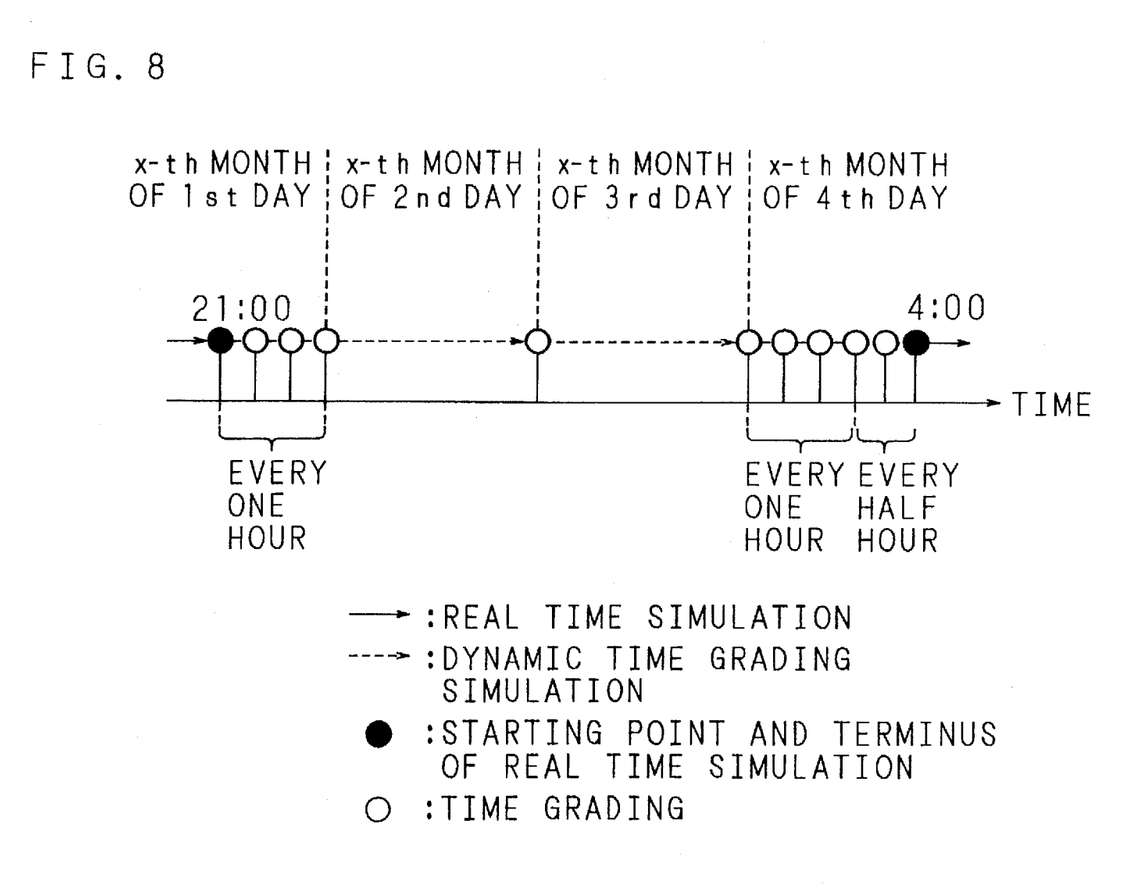
FIG. 8 is a schematic diagram for explaining other embodiment of the production system of the invention.

In this case, it does not matter much when the virtual creature has already fallen in sleep at 21:00 (9 o'clock in the evening) on the first day of X-th month when the system was stopped and was still sleeping at 4:00 (4 o'clock in the morning) on the fourth day of X-th month when the system was restarted. When the virtual creature is a nocturnal animal, however, the virtual creature is still active after 21:00 (9 o'clock in the evening) on the first day of X-th month when the system is stopped, and it may have a meal in this period. At 4:00 (4 o'clock in the morning) on the fourth day of X-th month when the system is restarted, when the virtual creature is active and eats before falling in sleep several hours later, or makes various activities to increase the degree of fatigue, and therefore it is possible that the variables in the working memory 82 be changed.

Therefore, in the abovementioned case, when the dynamic time grading simulation is done by regarding one day as time grading only, the variables in the working memory 82 may not be matched, not in all but in part, between the system stopping time and the restarting time. To cope with such a situation, the following processing is enabled in the production system of the invention.

That is, in the period from the system stopping time until the change of date, the dynamic time grading simulation is conducted at time grading with a unit time of one hour, for example, and thereafter the dynamic time grading simulation is conducted at time grading with a unit time of one day, and then the dynamic time grading simulation is conducted at time grading with a unit time of one hour on the system restarting day from the time of change of date. In such technique, more real simulation is possible without any practical problem for the processing time.

According to the production system of the invention, as described herein, the matching processing is not done at lower classes than the set time grading, so that the processing time is cut short by the corresponding portion, and moreover simulation is done by the variable and production rule corresponding to a longer unit time for one processing time of the system, corresponding to the time grading in which the simulation itself is set, so that the processing time is substantially shortened.

Besides, when simulating the state of the virtual world and behavior of the virtual creature during system shutdown period upon the system restarting moment, by simulating the period at both ends of the simulation time at a lower time grading than the applicable time grading, more real simulation is possible without any practical problem for the processing time.

Still more, as for the period at both ends of the period subjected to be simulated, by applying a lower time grading than the time grading applied to the middle period, more real simulation capable of maintaining matching of variables in the working memory can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A production system for time series simulation of a virtual state set therein, comprising:

a working memory storing plural variables for expressing said virtual state;

a rule base storing plural production rules which specify the change of said virtual state, and each which is composed of a condition part for specifying said variables and an execution part for changing them; and an inference processing unit performing a matching processing for matching said variables and said production rules, and picking up a production rule which satisfies the condition part from said working memory, a conflict resolution processing for selecting one out of plural production rules having been picked up according to a predetermined condition, an execution processing for executing the execution part of one selected production rule, and a processing for changing the variables in said working memory according to the execution result;

wherein said working memory stores said variables after they are classified into plural time classes according to the lengths of unit time for simulation;

said rule base stores said production rules after they are classified into plural time classes according to the lengths of unit time for simulation; and said inference processing unit decides a time grading so as to select one of said plural time classes and then matches a variable and a production rule belonging to the time class equal to or higher than said selected time class.

2. The production system as set forth in claim 1, wherein said inference processing unit executes said matching processing for a period of time at each end portion of said period to be simulated.

3. A production system for time series simulation of a virtual state set therein, in a period from previous stopping time till starting time, when starting, comprising:

a working memory storing plural variables for expressing said virtual state;

a rule base storing plural production rules which specify the change of said virtual state, and each of which is composed of a condition part for specifying said variables and an execution part for changing them; and an inference processing unit performing matching processing for matching said variables and said production rules, and picking up the production rule which satisfy the condition part from said working memory, a conflict resolution processing for selecting one out of plural condition rules having been picked up according to a predetermined condition, an execution processing for executing the execution part of one selected production rule, and a processing for changing the variables in said working memory according to the execution result;

wherein said working memory stores said variables after they are classified into plural time classes according to the lengths of unit time for simulation;

said rule bases stores said production rules after they are classified into plural time classes according to the lengths of unit time for simulation; and said inference processing unit, when starting, decides a time grading so as to select one of said plural time classes corresponding to a period of time from a previous stop until a starting point, and then matches a variable and a production rule belonging to the time class equal to or higher than said selected time class.

4. A production system for time series simulation of a virtual state, comprising:

a working memory storing a plurality of variables for expressing said virtual state stored after said plurality of variables are classified into a plurality of time classes based on a period of time set for simulation;

a rule database storing a plurality of production rules which specify the change of said virtual state stored after said plurality of production rules are classified into a plurality of time classes according to the period of time for set simulation; and an inference processing unit determining a time grading and selecting one of said plurality of time classes and then matching a variable and a production rule belonging to the time class equal to or higher than said selected time class, executing said selected production rule, and changing the variables in said working memory according to the execution result.

* * * * *